United States Patent Office

2,972,589
Patented Feb. 21, 1961

2,972,589
PLASTICIZED RESIN COMPOSITIONS
Robert Steckler, Russell, Ohio, assignor to Food Machinery and Chemical Corporation, New York, N.Y., a corporation of Delaware
No Drawing. Filed Oct. 29, 1956, Ser. No. 618,678
8 Claims. (Cl. 260—18)

This invention relates to new plasticized epoxy resins and, more particularly, to epoxy resins which are plasticized with esters of epoxidized fatty acids.

The expanding use of epoxy resins has created a large demand for suitable plasticizers, particularly for those applications where it is desired to enhance the flexibility, impact strength, and rheological and other properties of these resins. Compounds which are satisfactory plasticizers should not only impart plasticity and its accompanying benefits, but they should also preserve the desirable properties which are characteristic of the original resin. The product should be homogenously plasticized, and this effect should be stable to the action of time and environment.

Plasticizers which fulfill these requirements, therefore, should be completely compatible with the resin without migration to or bleeding at the surface. They should be non-volatile, and should resist extraction on immersion in water, oil or other solvents. The plasticized resin should be stable to the action of light and extremes of temperature, and inert with respect to other resins and films with which it may come in contact. It is an object of this invention to provide the art with plasticized epoxy resins having these desirable properties.

Another object is to provide permanently plasticized epoxy resin compositions.

A further object is to provide plasticizing compositions which not only enhance the properties of the cured resins, but also improve the rheological properties of the uncured resins, thereby facilitating casting and other manipulations. Other objects, and their attendant advantages, will become apparent from the subsequent description of this invention.

It has been discovered that particularly effective permanent plasticization of epoxy resins may be achieved through the use of esters of epoxidized fatty acids, under conditions which allow the chemical incorporation of these esters into the plasticized resin. Permanent plasticization of this type, often referred to as "chemical" or "internal" plasticization, is highly desirable, but rarely possible, due to the differences in structure and functionality usually encountered between resin and plasticizer. Even when some sort of chemical combination between plasticizing agent and resin is possible, this frequently results in a weakened resin due to alteration of the structure of the polymer molecules. Because of the importance of this latter effect, usually compounds which are physically compatible, rather than chemically bonded, are sought to impart flexibility and other properties to a resin. Such physical plasticizers are initially incorporated into the resin by thorough mixing, but they may, with time, migrate through the resin to produce the frequently observed phenomena of bleeding, "blushing," etc. This migration to the surface, and eventual loss of the plasticizer through volatilization, wear, and solvent and other interactions, leaves the resin brittle and weakened. The epoxidized fatty esters which have been discovered to be effective internal plasticizers when combined with epoxy resins, produce compositions which are both flexible and tough, and which may be obtained from resins which heretofore had cured to only hard and brittle products.

In addition to producing plasticized cured products, it has been discovered that the properties of the uncured resin composition may also be affected, with accompanying advantages. For example, the viscosity of the epoxy resin may be lowered, thereby improving penetration and flow. For structural purposes such as casting and laminating, low molecular weight liquid epoxy resins have commonly been used, since the higher molecular weight resins are too viscous, even when heated, to penetrate cavities in molds and to flow properly. But for some applications, such as coating and laminating, even the lowest molecular weight condensation products of bisphenol and epichlorhydrin may be too viscous, so that it is often necessary to employ these resins in the form of solutions. Adding the plasticizer of this invention, thereby lowering the viscosity of the resin, not only improves penetration and flow, but also permits the use of larger amounts of fillers and thereby reduces the cost.

In addition to their plasticizing effect, these fatty acid esters are useful as modifiers to regulate the chain length and degree of cross-linking, and may also be used to adjust the rate of cure of the resin composition.

This combination of advantages is produced only when the epoxy resins are cured under conditions which favor chemical reaction between the plasticizer and the resin composition. The results reported herein show that the plasticizing effect and the compatibility of epoxy fatty acid esters are dependent on both the nature of the curing catalyst and the curing conditions.

Although epoxy resins may generally be cured at room temperature with amine catalysts, it has been found that room temperature cure produces, in the presence of the plasticizers disclosed herein, a plasticizing effect that is inferior to that which is obtainable with the same composition at elevated temperatures. Many of these epoxy plasticizer formulations which produce resins which are perfectly clear, tough and extremely flexible when cured at temperatures above about 100° C., turn opaque, granular and hard during room temperature cure. Under these low temperature conditions, the epoxy resin probably cures to the cross-linked stage without reacting to any appreciable extent with the epoxidized fatty ester, and the plasticizing effect of the latter component is small. The plasticizer can subsequently be extracted from such resin compositions, indicating that the plasticizer is not chemically bonded during room-temperature curing conditions. Although the explanation for this is not completely clear, it is suggested that at lower temperatures the epoxy fatty ester does not react fast enough to compete with the other reactions occurring during curing, whereas at elevated temperatures the epoxy ester is activated, and reacts with the resin.

The epoxy resin component of the present invention may be chosen from the available ethoxyline resin products on the market, including the Epon products of the Shell Chemical Co. and the Araldite products of the Ciba Co. In the literature, epoxy resins are described as linear polyalcohol polyethers produced by reacting polyhydroxy aromatic hydrocarbons such as resorcinol, bisphenol A and diphenylol propane with epichlorohydrin or dichlorohydrin in the presence of an inorganic or organic base, in aqueous or alkaline solution and preferably with the application of heat, to form a thermoplastic resin containing an average of between one and two terminal epoxy groups per polymer molecule. Epoxy resins are conveniently characterized by their epoxide equivalent, which is defined as the number of grams of resin which contain one gram-equivalent of epoxide. Epoxy resins having an epoxide equivalent below about 200–250 are liquid at room temperature; above that, they are semi-solid or solid. The lower molecular weight epoxy resins are preferred in the instant invention, compatibility with the plasticizers decreasing rapidly as the epoxide equivalent is increased. A maximum epoxide equivalent of about 450-500 is operative with selected plasticizers, with a preferred range of about 140-300.

On curing, epoxy resins are cross-linked to form high molecular weight products, the cross-linking taking effect through the reactive epoxide groups and probably also through the hydroxyl groups which are spaced along the resin molecule. A variety of curing agents may be used, most important of which are polyfunctional amines and polyfunctional acids and anhydrides, although other reactive agents such as urea-formaldehyde resins or polyamides are used in special applications. In general, amine curing agents and some of the more reactive anhydrides are preferred.

Plasticization of the cured resin, thereby controlling its hardness and brittleness, enhances its utility. Particularly effective plasticization is achieved, in this invention, from certain esters of epoxidized fatty acids.

Useful esters of the present invention may be derived from unsaturated fatty acids containing about 8 to 24 carbon atoms. In general, mono-unsaturated fatty acids containing about 12 to 18 carbon atoms are preferred. The fatty acid group may be derived from any animal, vegetable or marine oil containing unsaturated fatty acid groups. They may be derived from the mixed fatty acids contained in such oils, or from isolated unsaturated fatty acids.

Epoxidation of these acids is carried out by conventional methods, such as the reaction of aqueous sodium hydroxide on the chlorohydrin of the unsaturated acid. The epoxidized fatty acid is then esterified with a suitable alcohol; or the ester may be prepared first and then epoxidized.

The alcoholic component of the esters may be selected from the group consisting of aliphatic alcohols, "Cellosolve" (monoalkyl ethers of ethylene glycol), cycloaliphatic alcohols, aryl and aralkyl and allyl alcohols, and substituted derivatives. Most efficient plasticization is obtained from esters of straight or branched chain aliphatic alcohols having a maximum of four carbon atoms, such as methyl, ethyl, propyl, allyl, isopropyl, butyl, sec.-butyl and tert.-butyl, although alcohols having at least six carbon atoms are also operative; and from esters of an alkyl "Cellosolve" such as those derived from ethylene glycol and propylene glycol, wherein the alkyl group again preferably contains a maximum of four carbon atoms, with an operative range of at least six carbon atoms. Other useful esters include those derived from benzyl alcohol, cyclohexanol, phenol, and their derivatives.

These esters may be prepared by any of the conventional methods, as, for example, by reacting the alcohol or "Cellosolve" with the acid or the acid chloride, or by first transforming the alcohol into the corresponding halide and reacting the latter with a salt of the selected acid.

The particular epoxy ester selected varies with the nature of the epoxy resin and curing agent used, as does the optimum plasticizer content for compatibility and effectiveness. Example 1 below illustrates the effect of varying proportions of a particular plasticizer and resin on properties of the cured resin.

EXAMPLE 1

Resin compositions were prepared by mixing the following components in the proportions shown in Table 1 below: an epoxy resin prepared by condensing epichlorohydrin with bisphenol A and having an epoxide equivalent of 225-290, butyl epoxytallate as plasticizer and α-methylbenzyldimethylamine as curing agent. The compositions were cured by heating overnight at 120° C. The properties of cured discs obtained from varying proportions of epoxy resin and plasticizer are shown in Table 1.

Table 1.—Effect of plasticizer ratio on cured resin

| Composition (parts by weight) | | | Properties of cured resins | | |
|---|---|---|---|---|---|
| Epoxy resin | Butyl Epoxytallate | Curing Agent | Clarity | Flexibility | Hardness |
| 80 | 20 | 6 | Clear | Rigid | 73 |
| 70 | 30 | 6 | ---do--- | Mod. flexible, tough. | 40 |
| 60 | 40 | 6 | ---do--- | Very flexible, rubbery. | 6 |
| 50 | 50 | 6 | ---do--- | Extremely flexible, rubbery. | very soft. |

The results of Table 1 indicate that, with butyl epoxytallate, optimum plasticization is obtained in the range of 30 to 40 parts of plasticizer per hundred parts of composition. The optimum ratio varies with the particular plasticizer used. For example, using methyl "Cellosolve" epoxystearate with the resin of Example 1, best results are obtained with about 20-30 parts per hundred of plasticizer. In general, the preferred range for the plasticizers of this invention is about 15-40% plasticizer. Within this range the cured compositions are clear and flexible. Below about 15% plasticizer the products start to become rigid, and below about 5% there is no significant plasticizing action. When more than about 50% plasticizer is present the products generally become too soft and tacky for practical use.

In Example 2 is illustrated the effect of curing plasticized compositions at elevated temperatures as compared with room temperature cure.

EXAMPLE 2

Resin compositions were prepared by mixing the following components: 60 parts by weight of an epoxy resin prepared by condensing epichlorohydrin with bisphenol A and having an epoxide equivalent of 190-210, 40 parts of dimethylbenzyl epoxystearate as plasticizer, and 6 parts of dimethylamino propylamine as curing agent. The properties of cured discs are shown in Table 2.

Table 2.—Effect of curing conditions on plasticized resin

| Curing conditions | | Properties of cured resins | | |
|---|---|---|---|---|
| Temp. | Time hrs. | Clarity | Flexibility | Hardness |
| 125° C | 20 | Clear | Flexible | 18 Shore D. |
| Rm. temp | 24 | Opaque | Rigid | Hard. |

In Example 3 is illustrated the relative effectiveness of various plasticizers with a given epoxy resin.

EXAMPLE 3

Resin compositions were prepared by mixing the following components: 70 parts by weight of an epoxy resin prepared by condensing epichlorohydrin with bisphenol A and having an epoxide equivalent of 225-290, 30 parts of an epoxy ester as plasticizer, and 6 parts of α-methylbenzyldimethylamine as curing agent. The properties of discs cured by heating for 20 hours at 120° C. are shown in Table 3.

Table 3.—Effect of different plasticizers on cured resin

| Plasticizer | Properties of cured resins | | |
|---|---|---|---|
| | Clarity | Flexibility | Shore D |
| Methyl Epoxysoyoate | Clear | Sl. Flexible | 28 |
| Butyl Epoxytallate | ---do--- | Mod. Flexible | 40 |
| Butoxyethyl Epoxytallate | ---do--- | Very Flexible | 22 |
| Methyl Epoxystearate | ---do--- | Sl. Flexible | 42 |

Other resin additives, such as pigments, fillers, extenders, solvents, etc., may be present in the compositions of this invention in the amounts ordinarily employed for the purposes indicated.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

That which is claimed as patentably novel is:

1. A process for the production of plasticized resin compositions comprising curing at elevated temperatures, by reacting with a polyfunctional amine curing agent, a mixture comprising (A) about 50 to 95% of a glycidyl polyether of a dihydric phenol having an average of between one and two epoxy groups per molecule and an epoxide equivalent below about 500 and (B) about 5 to 50% of an epoxy ester whose acidic component is an epoxidized fatty acid of about 8–24 carbon atoms and whose alcoholic component is an ethylene glycol monoalkyl ether having 1 to 6 carbon atoms in the alkyl group.

2. A process for the production of plasticized resin compositions comprising curing at elevated temperatures, by reacting with a polyfunctional amine curing agent, a mixture comprising (A) about 60 to 85% of a glycidyl polyether of a dihydric phenol having an average of between one and two epoxy groups per molecule and an epoxide equivalent of about 140 to 300 and (B) about 15 to 40% of an epoxy ester whose acidic component is an epoxidized fatty acid of about 12 to 18 carbon atoms and whose alcoholic component is an ethylene glycol monoalkyl ether having 1 to 4 carbon atoms in the alkyl group.

3. A plasticized composition comprising (A) about 50 to 95% of a glycidyl polyether of a dihydric phenol having an average of between one and two epoxy groups per molecule and an epoxide equivalent below about 500, (B) an amine curing agent for said glycidyl polyether and (C) about 5 to 50% of an epoxy ester whose acidic component is an epoxidized fatty acid of about 8 to 24 carbon atoms and whose alcoholic component is an ethylene glycol monoalkyl ether having 1 to 6 carbon atoms in the alkyl group.

4. A plasticized composition comprising (A) about 60 to 85% of a glycidyl polyether of a dihydric phenol having an average of between one and two epoxy groups per molecule and an epoxide equivalent of about 140 to 300, (B) an amine curing agent for said glycidyl polyether and (C) about 15 to 40% of an epoxy ester whose acidic component is an epoxidized fatty acid of about 12 to 18 carbon atoms and whose alcoholic component is an ethylene glycol monoalkyl ether having 1 to 4 carbon atoms in the alkyl group.

5. The composition of claim 1, wherein (B) is 2-butyl oxyethyl epoxytallate.

6. The composition of claim 1, wherein (B) is 2-methyl oxyethyl epoxystearate.

7. The process of claim 1, wherein (B) is 2-butyl oxyethyl epoxytallate.

8. The process of claim 1, wherein (B) is 2-methyl oxyethyl epoxystearate.

References Cited in the file of this patent

UNITED STATES PATENTS

| | | |
|---|---|---|
| 2,485,160 | Niederhauser et al. | Oct. 18, 1949 |
| 2,682,514 | Newey | June 29, 1954 |
| 2,682,515 | Naps | June 29, 1954 |

UNITED STATES PATENT OFFICE

CERTIFICATION OF CORRECTION

Patent No. 2,972,589				February 21, 1961

Robert Steckler

It is hereby certified that error appears in the above numbered patent requiring correction and that the said Letters Patent should read as corrected below.

Column 6, lines 23 and 24, for "claim 1, wherein (B) is 2-butyl oxyethyl" read -- claim 3, wherein (C) is 2-butoxyethyl --; lines 25 and 26, for "claim 1, wherein (B) is 2-methyl oxyethyl" read -- claim 3, wherein (C) is 2-methoxyethyl --; lines 27 and 28, for "2-butyl oxyethyl" read -- 2-butoxyethyl --; lines 29 and 30, for "2-methyl oxyethyl" read -- 2-methoxyethyl --.

Signed and sealed this 8th day of August 1961.

(SEAL)
Attest:

ERNEST W. SWIDER
Attesting Officer

DAVID L. LADD
Commissioner of Patents